US009674860B2

(12) United States Patent
Park et al.

(10) Patent No.: US 9,674,860 B2
(45) Date of Patent: Jun. 6, 2017

(54) METHOD AND APPARATUS FOR EFFICIENT AGGREGATION SCHEDULING IN WIRELESS LOCAL AREA NETWORK (WLAN) SYSTEM

(71) Applicant: Electronics and Telecommunications Research Institute, Daejeon (KR)

(72) Inventors: Hyun Gu Park, Daejeon (KR); Sok Kyu Lee, Daejeon (KR)

(73) Assignee: Electronics and Telecommunications Research Insitute, Daejeon (KR)

( * ) Notice: Subject to any disclaimer, the term of this patent is extended or adjusted under 35 U.S.C. 154(b) by 150 days.

(21) Appl. No.: 14/178,960

(22) Filed: Feb. 12, 2014

(65) Prior Publication Data
US 2014/0314060 A1 Oct. 23, 2014

(30) Foreign Application Priority Data
Apr. 17, 2013 (KR) ........................ 10-2013-0042097

(51) Int. Cl.
*H04W 72/12* (2009.01)
*H04N 21/85* (2011.01)
*H04N 21/8547* (2011.01)
*H04L 12/851* (2013.01)
*H04L 12/841* (2013.01)
*H04L 12/823* (2013.01)
*H04L 29/08* (2006.01)

(52) U.S. Cl.
CPC ..... *H04W 72/1242* (2013.01); *H04L 47/2441* (2013.01); *H04L 47/28* (2013.01); *H04L 47/32* (2013.01); *H04N 21/8547* (2013.01); *H04L 67/325* (2013.01)

(58) Field of Classification Search
CPC .......... H04W 72/1242; H04W 72/1221; H04L 69/322; H04L 47/20–47/28; H04L 65/80
See application file for complete search history.

(56) References Cited

U.S. PATENT DOCUMENTS

| 7,948,991 | B1 * | 5/2011 | Hart | H04L 1/1854 370/395.4 |
| 8,824,304 | B2 * | 9/2014 | Vulkan | H04L 65/80 370/238 |
| 2005/0265302 | A1 * | 12/2005 | Nishibayashi | H04L 45/00 370/349 |
| 2007/0104162 | A1 * | 5/2007 | Kneckt | H04W 72/1221 370/338 |

(Continued)

Primary Examiner — Xavier Szewai Wong
(74) Attorney, Agent, or Firm — NSIP Law

(57) ABSTRACT

Provided is a method and apparatus for efficient aggregation scheduling in a wireless local area network (WLAN) system, the apparatus including a delay setting unit to set a required delay time for each access category (AC), a storing unit to store a traffic identification (TID) of a packet in a queue of a corresponding AC when the packet arrives, a delay time calculator to calculate a maximum delay time predicted when the packet arriving at the queue is configured to be an A-MPDU and the configured A-MPDU is transmitted, and an A-MPDU configuring unit to compare the calculated maximum delay time and the required delay time, and configure a corresponding A-MPDU when the calculated maximum delay time is greater than the required delay time.

16 Claims, 6 Drawing Sheets

(56) References Cited

U.S. PATENT DOCUMENTS

| | | | |
|---|---|---|---|
| 2007/0211625 A1* | 9/2007 | Liu .................. | H04L 47/10 370/229 |
| 2010/0157962 A1* | 6/2010 | Koo ................. | H04W 72/1221 370/338 |
| 2015/0295836 A1* | 10/2015 | Welin ................ | H04W 56/00 370/350 |
| 2015/0350381 A1* | 12/2015 | Chang ............... | G06F 9/5077 709/203 |

* cited by examiner

| TID | Access category |
|-----|-----------------|
| 1 | AC_BK |
| 2 | AC_BK |
| 0 | AC_BE |
| 3 | AC_BE |
| 4 | AC_VI |
| 5 | AC_VI |
| 6 | AC_VO |
| 7 | AC_VO |

METHOD AND APPARATUS FOR EFFICIENT AGGREGATION SCHEDULING IN WIRELESS LOCAL AREA NETWORK (WLAN) SYSTEM

CROSS-REFERENCE TO RELATED APPLICATION

This application claims the priority benefit of Korean Patent Application No. 10-2013-0042097, filed on Apr. 17, 2013, in the Korean Intellectual Property Office, the disclosure of which is incorporated herein by reference.

BACKGROUND

1. Field of the Invention

The present invention relates to technology for effective use of an aggregation scheme suggested to improve a throughput in an Institute of Electrical and Electronics Engineers (IEEE) 802.11n and an IEEE 802.11ac.

2. Description of the Related Art

An Institute of Electrical and Electronics Engineers (IEEE) 802.11 standardization group providing a current wireless local area network (WLAN) standard has been establishing a next generation standard in a direction of increasing a speed of a physical (PHY) layer in accordance with advancements in technology.

Currently, a PHY layer speed may be supported by up to 11 megabits per second (Mbps) in 802.11b, up to 54 Mbps in 802.11g and 802.11a, up to 150 Mbps based on a single transmission and reception antenna in 802.11n, and up to 300 Mbps based on a single transmission and reception antenna in 802.11ac having a process of standardization.

However, a speed increment in a media access control (MAC) layer may not be directly proportional to a speed increment in the PHY layer. A speed experienced by a user may correspond to a speed of the MAC layer and thus, the speed increment in the PHY layer may not provide an increase in the speed experienced by the user.

Such an issue may be caused by MAC header information, preamble information included for each packet, and an overhead occurring due to an ACK transmission performed after a short interframe space (SIFS), for example, 16 microseconds (µs).

To solve an issue of inefficiency resulting from the overhead, a MAC layer of an 802.11n standard defines two aggregation methods including an aggregated-MAC service data unit (A-MSDU) and an aggregated-MAC protocol data unit (A-MPDU). The two aggregation methods may be utilized to improve an efficiency of a MAC throughput in a case in which the PHY layer speed is greater than 1 gigabit per second (Gbps) such as a case of 802.11ac.

FIG. 1 is a diagram illustrating a configuration of a conventional A-MSDU frame.

Referring to FIG. 1, a single A-MSDU may include one PHY preamble, one PHY header, and one MAC header. Also, a plurality of packets may be distinguished by a 14 bytes delimiter including a destination address (DA), a source address (SA), and a length.

FIG. 2 is a diagram illustrating a configuration of a conventional A-MPDU frame.

Referring to FIGS. 2 and 3, each subframe may include an MPDU including a MAC header, and a 4 byte delimiter having a packet to which cyclic redundancy check (CRC) information is incorporated.

FIG. 3 is a diagram illustrating a configuration of a conventional A-MPDU subframe.

Effects of using an A-MSDU differ from Effects of using an A-MPDU. Since, the A-MSDU includes one MAC header and one PHY header irrespective of a number of MSDUs to be connected, a ratio of an overhead may be relatively small when compared to an entire packet. Thus, when a channel state is favorable and an error does not occur, using the A-MSDU may provide a maximal efficiency.

However, in a wireless channel, a packet error rate may increase based on a distance due to characteristics of the wireless channel. Transmission using a scheme having a high reliability level, which may not lead to an error, may require a relatively low PHY rate. In this case, effects of aggregation may not be realized.

When the A-MSDU is used in an error channel, the A-MSDU may need to be entirely retransmitted although an error occurs in one bit of the MSDUs included in the A-MSDU because an error MSDU of the MSDUs included in the A-MSDU may not be recognized.

Thus, in a case of requiring retransmission as described above, using the A-MSDU may be unsuitable.

In a standard, the A-MSDU is defined to be used by selecting one from two maximum lengths of 4 kilobytes (kB) and 8 kB. In general, commercial products adopt 4 kB as a maximum length. When aggregation is performed based on 8 kB, an error rate of a packet may be increased as compared to 4 kB. Thus, effects resulting from the aggregation may not be realized.

Accordingly, most commercial products may adopt the A-MPDU method, in lieu of the A-MSDU method.

In a case of the A-MPDU, each of the packets included in the A-MPDU may include the MAC header information, and the CRC information associated with a corresponding packet may be included in a tail of each of the packets. Thus, when compared to the A-MSDU, the overhead may be generated by incorporating the MAC header information for each of the packets.

However, when an error occurs in a predetermined portion in a wireless state including an error channel, the A-MPDU may select another packet, aside from the packet including an error portion based on the CRC information included in each of the packets, thereby receiving the selected packet. Thus, the packet including the error portion may be selectively retransmitted rather than transmitting whole packets. In this light, the standard allows transmission of up to 64 kB in a process of configuring the A-MPDU in contrast to the A-MSDU in which the maximum length to be transmitted is limited by up to 8 kB.

Currently, the IEEE 802.11n standard defines only a configuration of the A-MPDU. Although the maximum length is limited up to 64 kB or a number of packets is limited up to 64, a method of configuring the A-MPDU has not been defined.

Thus, when the number of packets configuring the A-MPDU is fixed to be a predetermined number, efficiency of the throughput may be reduced and a delay time in a process may become longer.

As the number of packets configuring the A-MPDU increases, channel use efficiency may be increased and thus, the MAC throughput may be improved. However, a delay for generating the packet and transmitting the generated packet may become longer because a packet arriving at first may need to standby until a number of packets required for configuring the A-MPDU is stacked. Accordingly, a trade-off relationship may be established between the delay and the number of packets for configuring the A-MPDA, for example, the throughput.

Such delay may not affect a state in which a speed of generating a packet is greater than a speed of processing the PHY layer. When the speed of generating a packet is greater than the speed of processing the PHY layer, a packet queue of a MAC may be full of packets. In this instance, a maximum number of packets may be aggregated for transmission.

SUMMARY

According to an aspect of the present invention, there is provided an aggregated-media access control protocol data unit (A-MPDU) scheduling apparatus, including a delay setting unit to set a required delay time for each access category (AC), a storing unit to store a traffic identification (TID) of a packet in a queue of a corresponding AC when the packet arrives, a delay time calculator to calculate a maximum delay time predicted when the packet arriving at the queue is configured to be an A-MPDU and the configured A-MPDU is transmitted, and an A-MPDU configuring unit to compare the calculated maximum delay time and the required delay time, and configure a corresponding A-MPDU when the calculated maximum delay time is greater than the required delay time.

The A-MPDU scheduling apparatus may further include an A-MPDU transmitter to transmit the configured A-MPDU.

The storing unit may store the TID of the packet in the queue of the AC based on a table in which a result of matching the TID of the packet and the AC is recorded.

The packet may include the TID having a value between "0" and "8".

The delay setting unit may set the required delay time based on a priority of the packet.

The delay setting unit may set the required delay time based on a format of the packet.

When the format of the packet is a video stream, the delay setting unit may set the required delay time to be greater than that of another format.

When the format of the packet is a voice stream, the delay setting unit may set the required delay time to be less than that of another format.

According to another aspect of the present invention, there is also provided an A-MPDU scheduling method, including setting, by a delay setting unit, a required delay time for each AC, storing, by storing unit, a TID of a packet in a queue of a corresponding AC when the packet arrives, calculating, by a delay time calculator, a maximum delay time predicted when the packet arriving at the queue is configured to be an A-MPDU and the configured A-MPDU is transmitted, and comparing, by an A-MPDU configuring unit, the calculated maximum delay time and the required delay time, and configuring a corresponding A-MPDU when the calculated maximum delay time is greater than the required delay time.

The A-MPDU scheduling method may further include transmitting, by an A-MPDU transmitter, the configured A-MPDU.

The storing may include storing the TID of the packet in the queue of the AC based on a table in which a result of matching the TID of the packet and the AC is recorded.

The packet includes the TID having a value between "0" and "8".

The setting may include setting the required delay time based on a priority of the packet.

The setting may include setting the required delay time based on a format of the packet.

The setting may include setting the required delay time to be greater than that of another format when the format of the packet is a video stream.

The setting may include setting the required delay time to be less than that of another format when the format of the packet is a voice stream.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 5 is a diagram illustrating a table indicating a mapping of a traffic identification (TID) and an access category (AC)

DETAILED DESCRIPTION

Figure 1:
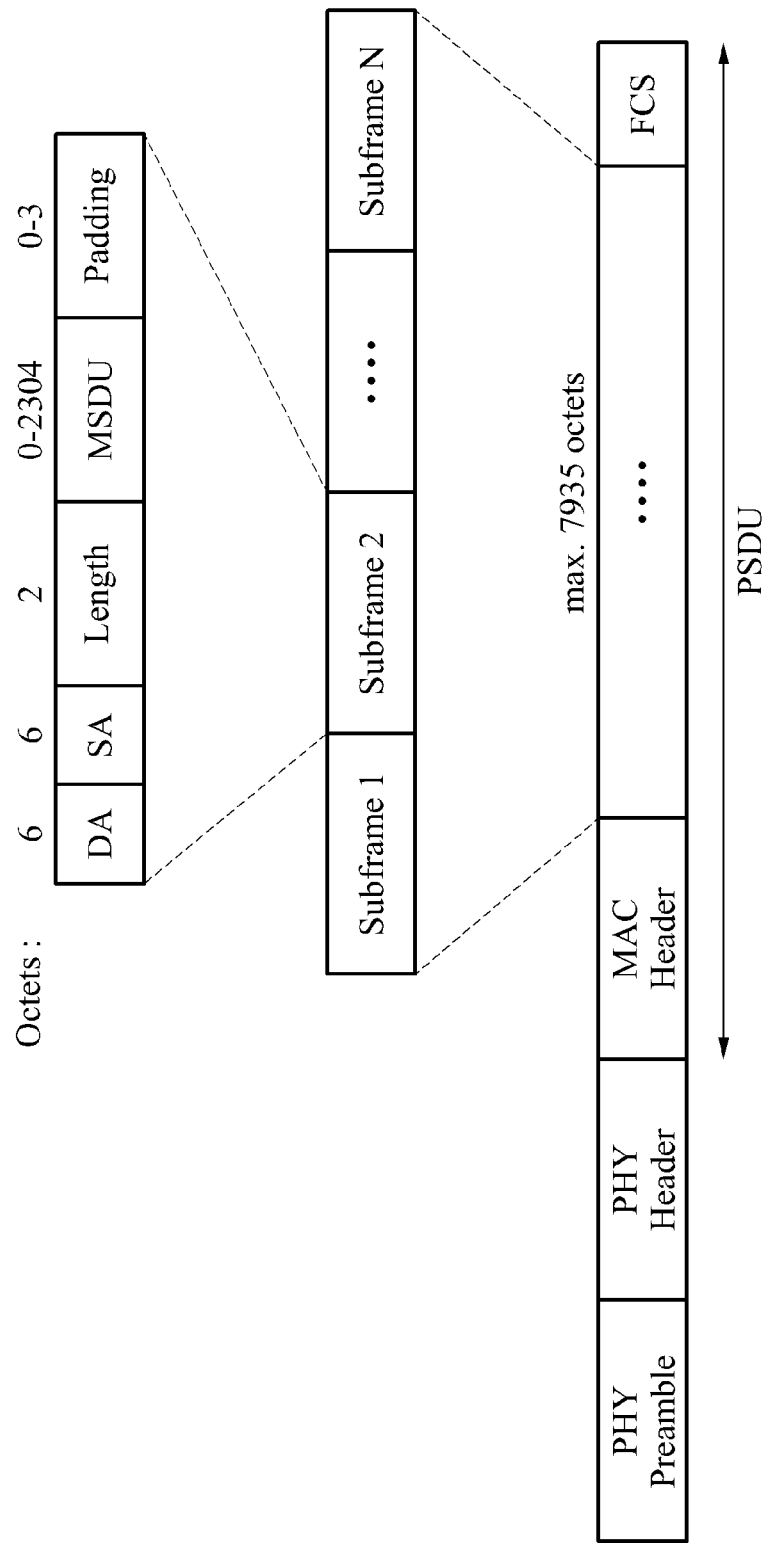
FIG. 1 is a diagram illustrating a configuration of a conventional aggregated-media access control service data unit (A-MSDU) frame.
Figure 2:
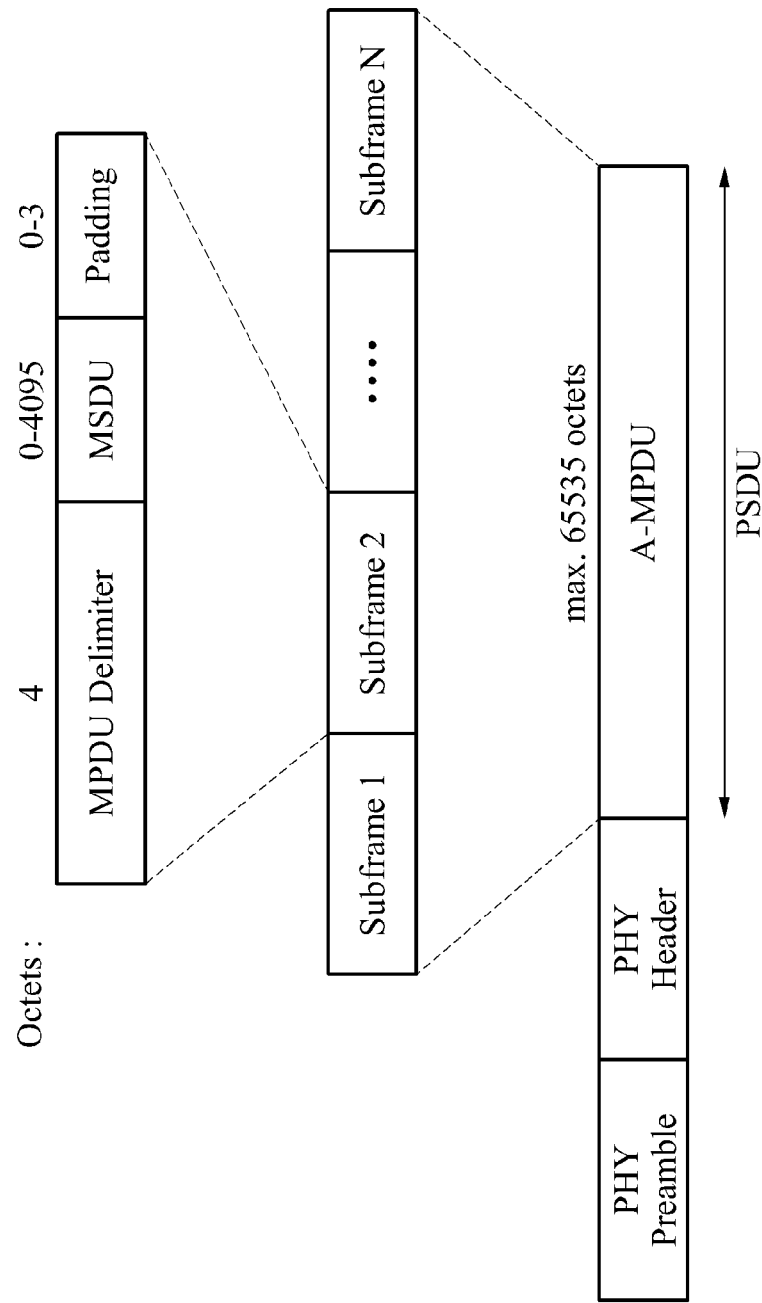
FIG. 2 is a diagram illustrating a configuration of a conventional aggregated-media access control protocol data unit (A-MPDU) frame.
Figure 3:
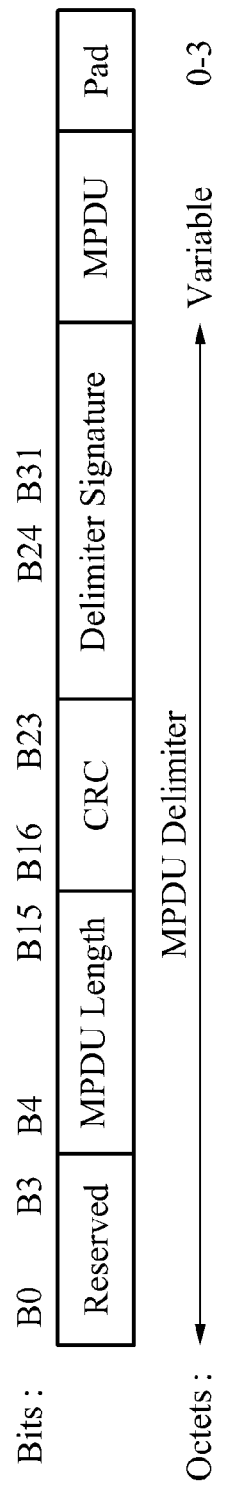
FIG. 3 is a diagram illustrating a configuration of a conventional A-MPDU subframe.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined detailed description related to a related known function or configuration they may make the purpose of the present invention unnecessarily ambiguous in describing the present invention, the detailed description will be omitted here. Also, terminologies used herein are defined to appropriately describe the exemplary embodiments of the present invention and thus may be changed depending on a user, the intent of an operator, or a custom. Accordingly, the terminologies must be defined based on the following overall description of this specification.

Figure 4:
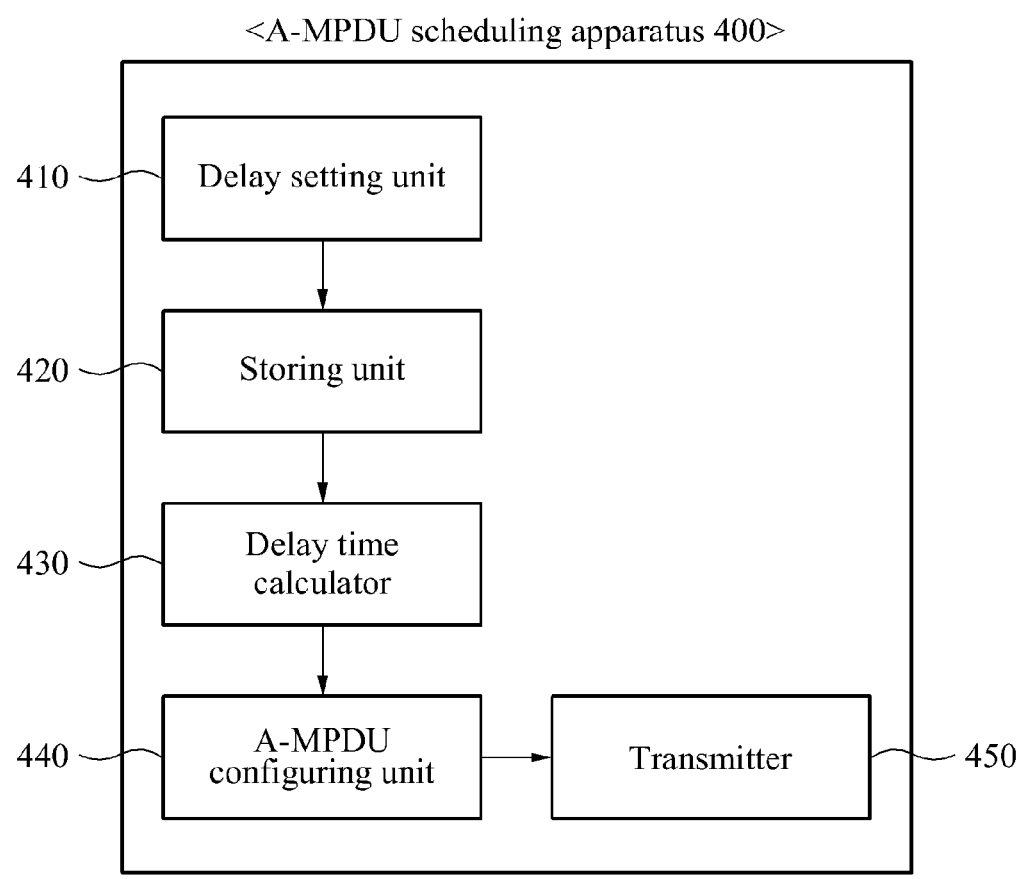
FIG. 4 is a block diagram illustrating an A-MPDU scheduling apparatus according to an embodiment of the present invention.

FIG. 4 is a block diagram illustrating an aggregated-media access control protocol data unit (A-MPDU) scheduling apparatus 400 according to an embodiment of the present invention.

An aspect of the present invention may provide an efficient scheduling method applicable in a case in which a packet randomly generated in lieu of a predetermined case in which packets are saturated.

Determining a number of packets to be included in an A-MPDU is an issue to be solved for an efficient use of the A-MPDU. Thus, an aspect of the present invention may provide a solution for the above issue.

The A-MPDU scheduling apparatus 400 according to an embodiment of the present invention may include a delay setting unit 410, a storing unit 420, a delay time calculator 430, an A-MPDU configuring unit 440, and a transmitter 450.

The delay setting unit 410 may set a required delay time for each access category (AC).

The storing unit 420 may store a traffic identification (TID) of a packet in a queue of a corresponding AC when the packet arrives.

An Institute of Electrical and Electronics Engineers (IEEE) 802.11e standard defines a type of traffic to be classified into four ACs. In the A-MPDU, packets each corresponding to a different AC may not be included in a single A-MPDU, and packets corresponding to an identical AC may be included in the A-MPDA. Thus, in general, when a system is configured, a packet queue may be generated for each of the ACs and managed by each of the ACs.

The four ACs may include AC_BE, AC_BK, AC_VI, and AC_VO. Here, BE indicates a best effort, BK indicates a background, VI indicates a video, and VO indicates a voice. Thus, the four ACs may be understood as four queues.

A packet occurring in an upper portion end may be classified in the upper portion end to have a value between "0" and "8". A wireless fidelity (Wi-Fi) multimedia (WMM) specification of a Wi-Fi alliance defines a TID value between "0" and "8" to be mapped using AC_BE, AC_BK, AC_VI, and AC_VO as shown in a table 500 of FIG. 5.

FIG. 5 is a diagram illustrating a table 500 indicating a mapping of a TID and an AC.

The storing unit 420 of FIG. 4 may store the TID of a packet in a queue of the AC based on a table on which a result of matching the AC and the TID of the packet is recorded.

The delay time calculator 430 may calculate a maximum delay time predicted when the packet arriving at the queue is configured to be an A-MPDU and transmitted.

The A-MPDU configuring unit 440 may compare the calculated maximum delay time and the set required delay time, and configure the A-MPDU when the calculated maximum delay time is greater than the set required delay time.

The delay setting unit 410 may set the required delay time based on a priority of packets.

A packet mapped on a predetermined AC may be stored in a packet queue of a corresponding AC.

When the packet stored in the packet queue corresponds to a first packet included in the A-MPDA, a timer may be operated to measure a time for staying in the queue based on the first packet.

A time measured by the timer may be defined as $T_{timer}$, and a required delay time set initially may be defined as $T_{delay}$.

When a result of calculating an equation of $T_{margin}=T_{delay}-(T_{timer}+T_{tx})$ indicates that $T_{margin}$ is less than $T_{alpha}$, all packets stacked in a queue may be configured to be a single A-MPDU and transmission of the configured A-MPDU may be performed. Here, $T_{tx}$ denotes a time required for the transmission of the configured A-MPDU.

A value of $T_{delay}$ may be set for each AC. For example, AC_BK, which is a background packet having the lowest priority, may require a relatively long period of the required delay time to be set. In a case of AC_BE, the required delay time may be set to provide an optimal speed.

The delay setting unit 410 may set the required delay time based on a format of a packet.

For example, when the format of the packet is a video stream, the delay setting unit 410 may set the required delay time greater than that of another format.

As another example, when the format of the packet is a voice stream, the delay setting unit 410 may set the required delay time to be less than that of another format.

In a case of AC_VI having a format of the video stream, as a throughput increases, a quality of a video may be improved. Thus, a relatively long period of delay time may be required. In a case of AC_VO including voice information, a delay time may be set to be shorter than a delay time of a voice recognizable for a user.

$T_{tx}$ may be calculated by adding a value obtained by dividing PHY Preamble+PHY Header by a transmission rate of PHY Preamble+PHY Header, and a value obtained by dividing a total length of a packet by a data transmission rate.

A value of $T_{alpha}$ may be set to be a time required for transmitting a single packet having an average length, and adjusted by increasing or decreasing for optimization.

The transmitter 450 may perform transmission of the configured A-MPDU.

In an example embodiment of the present invention, a WLAN user may receive the delay time required for each AC, and dynamically determine a number of A-MPDUs required a corresponding packet occurrence state based on a scheduling method for determining a number of aggregations in a state in which packets are not saturated, thereby achieving a maximal MAC throughput within a range fully satisfying input conditions.

Figure 6:
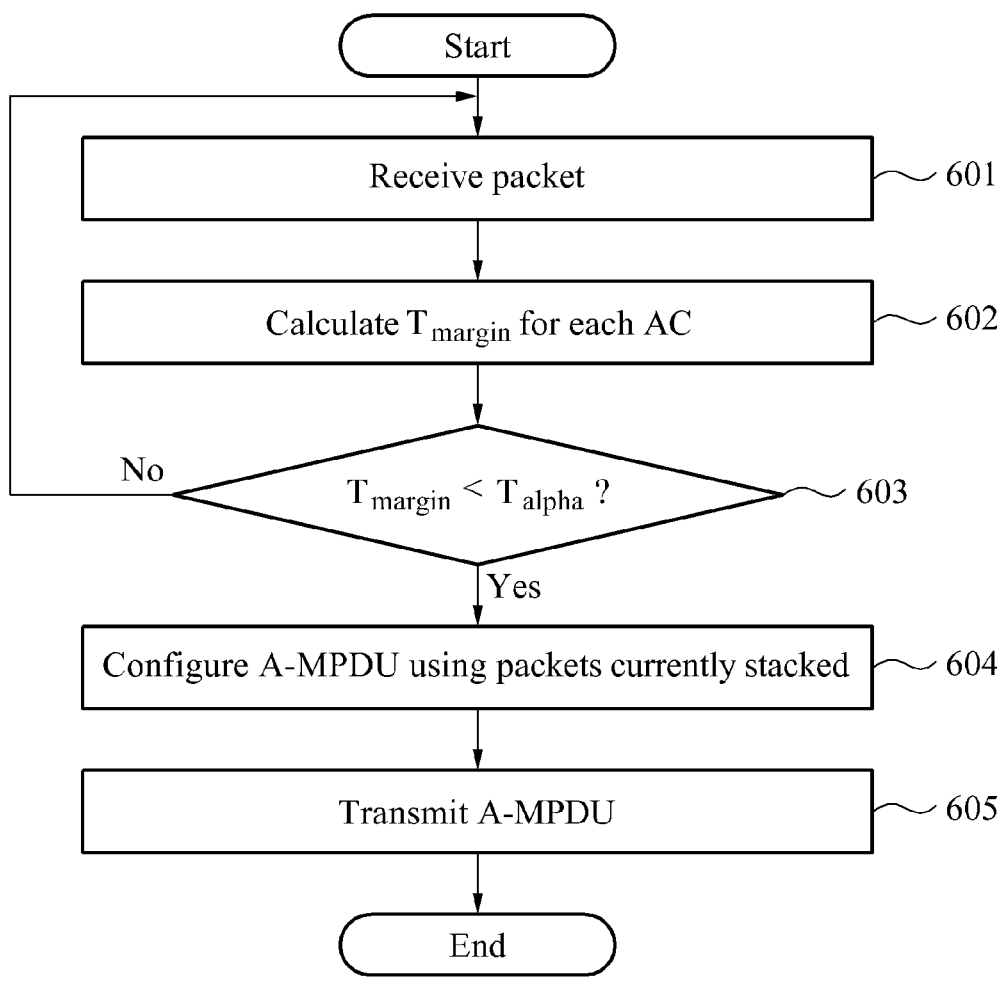
FIG. 6 is a flowchart illustrating an A-MPDU scheduling method according to an embodiment of the present invention.

FIG. 6 is a flowchart illustrating an A-MPDU scheduling method according to an embodiment of the present invention.

In the A-MSDU scheduling method according to an embodiment of the present invention, a packet may be received in operation 601.

Subsequently, each AC of the received packet may be input a required delay time, and a number of aggregations may be determined although packet occurrences are not saturated.

For example, $T_{margin}$ may be calculated for each AC of the received packet.

Hereinafter, a time measured by a timer may be defined as $T_{timer}$, and a required delay time set initially may be defined as $T_{delay}$.

In operation 602, when all packets stacked in a queue are configured in an A-MPDU and $T_{tx}$ indicates a time for transmitting the configured A-MDPU, $T_{margin}$ may be calculated.

$T_{margin}$ may be calculated using Equation 1.

$$T_{margin}=T_{delay}-(T_{timer}+T_{tx}) \quad \text{[Equation 1]}$$

In operation 603, the calculated $T_{margin}$ may be compared to $T_{alpha}$.

When a result of the comparing indicates that $T_{margin}$ is less than $T_{alpha}$, in operation 604, packets currently stacked may be configured in a single A-MPDU. In operation 605, transmission of the configured A-MPDU may be performed.

According to an aspect of the present invention, it is possible for a WLAN user to achieve a maximum efficiency of an MAC throughput within a range of fully satisfactory input conditions by receiving a required delay time for each AC, and dynamically determining a number of A-MPDUs based on a state of generating a packet using a scheduling method of determining a number of aggregations in a case in which packets are not saturated.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An aggregated-media access control protocol data unit (A-MPDU) scheduling apparatus, comprising:
    a delay setting processor configured to set a required delay time period for each access category (AC);
    a storage configured to store a traffic identification (TID) of a packet in a queue of a corresponding AC when the packet arrives;
    a delay time calculating processor configured to calculate a margin of time by subtracting, from the required delay time period, a time period of a first packet staying in the queue and a time period required for the transmission of the configured A-MPDU; and
    an A-MPDU configuring processor configured to aggregate, in an A-MPDU, packets currently stacked in the queue, when the margin of time is less than a time period required for transmitting a single packet, the single packet having an average length.

2. The apparatus of claim 1, further comprising:
    an A-MPDU transmitter configured to transmit the configured A-MPDU.

3. The apparatus of claim 2, wherein the storage is configured to store the TID of the packet in the queue of the AC based on a table in which a result of matching the TID of the packet and the AC is recorded.

4. The apparatus of claim 1, wherein the packet includes the TID having a value between "0" and "8".

5. The apparatus of claim 1, wherein the delay setting processor is configured to set the required delay time period based on a priority of the packet.

6. The apparatus of claim 1, wherein the delay setting processor is configured to set the required delay time period based on a format of the packet.

7. The apparatus of claim 6, wherein when the format of the packet is a video stream, the delay setting processor is configured to set the required delay time period to be greater than that of another format.

8. The apparatus of claim 6, wherein when the format of the packet is a voice stream, the delay setting processor is configured to set the required delay time period to be less than that of another format.

9. An aggregated-media access control protocol data unit (A-MPDU) scheduling method, comprising:
    setting, by a delay setting processor, a required delay time period for each access category (AC);
    storing, by a storage, a traffic identification (TID) of a packet in a queue of a corresponding AC when the packet arrives;
    calculating, by a delay time calculating processor, a margin of time by subtracting, from the required delay time period, a time period of a first packet staying in the queue and a time period required for the transmission of the configured A-MPDU; and
    aggregating in an A-MPDU, by an A-MPDU configuring processor, packets currently stacked in the queue, when the margin of time is less than a time period required for transmitting a single packet, the single packet having an average length.

10. The method of claim 9, further comprising:
    transmitting, by an A-MPDU transmitter, the configured A-MPDU.

11. The method of claim 10, wherein the storing comprises storing the TID of the packet in the queue of the AC based on a table in which a result of matching the TID of the packet and the AC is recorded.

12. The method of claim 9, wherein the packet includes the TID having a value between "0" and "8".

13. The method of claim 9, wherein the setting comprises setting the required delay time based on a priority of the packet.

14. The method of claim 9, wherein the setting comprises setting the required delay time based on a format of the packet.

15. The method of claim 14, wherein the setting comprises setting the required delay time to be greater than that of another format when the format of the packet is a video stream.

16. The method of claim 14, wherein the setting comprises setting the required delay time to be less than that of another format when the format of the packet is a voice stream.

* * * * *